United States Patent
Rumreich et al.

[11] Patent Number: 5,929,927
[45] Date of Patent: Jul. 27, 1999

[54] METHOD AND APPARATUS FOR PROVIDING A MODULATED SCROLL RATE FOR TEXT DISPLAY

[75] Inventors: Mark Francis Rumreich; Mark Robert Zukas, both of Indianapolis, Ind.

[73] Assignee: Thomson Consumer Electronics, Inc., Indianapolis, Ind.

[21] Appl. No.: 08/769,331

[22] Filed: Dec. 19, 1996

[51] Int. Cl.[6] ................................................ H04N 5/445
[52] U.S. Cl. ........................ 348/563; 348/564; 348/569; 348/589
[58] Field of Search ................................. 348/563, 564, 348/565, 567, 569, 586, 588, 589, 596, 600, 468; H04N 5/278, 5/45, 5/445

[56] References Cited

U.S. PATENT DOCUMENTS

| | | | |
|---|---|---|---|
| 5,512,954 | 4/1996 | Shintani | 348/468 |
| 5,576,768 | 11/1996 | Gomikawa | 348/468 |
| 5,734,436 | 3/1998 | Abe | 348/564 |

FOREIGN PATENT DOCUMENTS

| | | | |
|---|---|---|---|
| 0660602 | 6/1995 | European Pat. Off. | H04N 5/445 |
| 766463 | 4/1997 | European Pat. Off. | H04N 5/445 |
| 2150794 | 7/1985 | United Kingdom | G06F 3/153 |

OTHER PUBLICATIONS

PCT International Search Report dated Apr. 28, 1998.

*Primary Examiner*—Sherrie Hsia
*Attorney, Agent, or Firm*—Joseph S. Tripoli; Peter M. Emanuel; David T. Shoneman

[57] ABSTRACT

Apparatus and a method for displaying text information include a scrolling feature having a modulated scroll rate. Previously undisplayed text information stored in the buffer memory is accessed and scrolled into the display at a rate related to the amount of previously undisplayed text information stored in the buffer memory. Scrolling involves a pause in the movement of the displayed text after each complete row of text information is displayed. The pause duration is related to the amount of previously undisplayed text stored in the buffer memory. The text information may include closed caption information, teletext information, and text information associated with moving message displays.

20 Claims, 4 Drawing Sheets

METHOD AND APPARATUS FOR PROVIDING A MODULATED SCROLL RATE FOR TEXT DISPLAY

CROSS REFERENCE TO RELATED APPLICATIONS

This application is related to the following commonly-assigned U.S. patent applications: Ser. No. 08/770,770 (Attorney Docket No. RCA 88,200) entitled "METHOD AND APPARATUS FOR POSITIONING AUXILIARY INFORMATION PROXIMATE AN AUXILIARY IMAGE IN A MULTI-IMAGE DISPLAY", Ser. No. 08/769,329 (Attorney Docket No. RCA 88,231) entitled "TELEVISION APPARATUS FOR SIMULTANEOUS DECODING OF AUXILIARY DATA INCLUDED IN MULTIPLE TELEVISION SIGNALS", Ser. No. 08/769,333 (Attorney Docket No. RCA 88,461) entitled "VIDEO SIGNAL PROCESSING SYSTEM PROVIDING INDEPENDENT IMAGE MODIFICATION IN A MULTI_IMAGE DISPLAY", and Ser. No. 08/769,332 (Attorney Docket No. RCA 88,490) entitled "METHOD AND APPARATUS FOR REFORMATTING AUXILIARY INFORMATION INCLUDED IN A TELEVISION SIGNAL", all of which were filed in the name of Mark F. Rumreich et al. on the same date as the present application.

FIELD OF THE INVENTION

The invention relates to systems for generating signals suitable for producing text displays. More particularly, the invention relates to a method and apparatus for modulating the scroll rate of text information as it is displayed on a display device.

BACKGROUND

Closed captioning provides a visible text representation of a television program's audio content. Closed captioning data is encoded in an auxiliary information signal of the video signal. For example, in NTSC (National Television Standards Committee) television signals, two bytes of closed captioning data may be included during the latter half of each occurrence of line 21 of field 1. Additional closed caption data and similarly encoded information, such as extended data services information (XDS), may be included in other line intervals such as line 21 of field 2. United States law requires caption decoders in all television receivers having cathode ray tubes (CRT) larger than 13 inches. Therefore, most programs (video tapes included) now include captioning data.

Although captioning was developed to aid the hearing impaired, captioning can also provide a benefit to non-hearing impaired viewers as well. Providing captioning representing the audio program associated with an auxiliary image in a multi-image display, such as picture-in-picture (PIP) or picture-outside-picture (POP) displays, is an example of this type of additional benefit. As a specific example, activating a PIP feature produces a small image representing the content of a PIP program signal to be displayed in a portion of the main picture. However, only the audio program associated with the main picture is processed and coupled to the speakers of the television. The audio content of the PIP signal is lost. Because the audio program is important to the comprehension of a television program, the usefulness of the PIP feature is severely limited by the lack of an associated audio program. An approach to solving this problem is to display captions, i.e., visible text, representing the PIP audio programming portion of the display. However, the closed caption decoder in most television receivers processes only the caption information associated with the main picture, not the PIP signal.

An exception to this general rule is found in certain television receivers manufactured by Sharp Corporation such as model 31HX-1200 and 35HX-1200. These Sharp television receivers display captions representing the audio PIP image by providing switching capability that permits coupling of the PIP signal to the main caption decoder. PIP captions are displayed full size (up to 4 rows of 32 large characters) at the top or bottom of the screen (a user selectable position). An example of PIP captioning used by Sharp television receivers is shown in FIG. 1 which depicts a display including main image 100, PIP image 102 and PIP caption 104.

SUMMARY OF THE INVENTION

The invention resides, in part, in the inventors' recognition of a number of problems associated with the described PIP captioning implementation. First, main-picture captioning and auxiliary-picture captioning cannot be displayed simultaneously. Second, the small image combined with the caption display for the small image may obscure the main image to an extent that is objectionable to a user. For example, a PIP caption as in the Sharp implementation (up to 20% of the screen area) combined with a normal size PIP image (one-ninth of the screen area) may obscure more than 30% of the main video display. Third, the small-picture caption is difficult to follow simultaneously with small-picture video because the location of the caption at the top or bottom of the screen is physically disconnected from the small picture and may be a significant distance from the small picture. Fourth, the appearance of small-picture captions is virtually identical to main-picture captions causing users to become confused as to which image is associated with the caption. The combination of these problems may make auxiliary-picture captioning that is implemented in the manner described above objectionable to an extent that renders auxiliary-picture captioning useless for many viewers.

Therefore, a need exists in the art for a PIP captioning system that positions the PIP caption text proximate the PIP image. Such a system is disclosed in commonly assigned U.S. patent application Ser. No. 08/770,770 (Attorney Docket No. RCA 88,200) entitled "METHOD AND APPARATUS FOR POSITIONING AUXILIARY INFORMATION PROXIMATE AN AUXILIARY IMAGE IN A MULTI-IMAGE DISPLAY" that was filed in the name of Mark F. Rumreich et al. on the same date as the present application and is incorporated herein by reference. To comprehensibly position the PIP captioning information proximate the PIP image, the caption information is reformatted from the standard 4 lines by 32 characters closed caption display format specified in the EIA-608 standard to a 2 line by 18 character format. One reformatting technique is disclosed in commonly assigned U.S. patent application Ser. No. 08/769,332 (Attorney Docket No. RCA 88,490) entitled "METHOD AND APPARATUS FOR REFORMATTING AUXILIARY INFORMATION INCLUDED IN A TELEVISION SIGNAL" that was filed in the name of Mark F. Rumreich et al. on the same date as the present application and is incorporated herein by reference.

The inventors recognized that the comprehensibility of the displayed text would be further improved if the displayed lines of text, such as 2 lines, 18 characters each, of reformatted PIP captioning text, were to scroll through a text window. As used herein, the term scroll or scrolling refers to moving or re-locating text information, such as rows of text characters, in a display. Various approaches to scrolling text are envisioned. For example, the text information can move smoothly and continuously upward in the text display region. Also, scrolling can involve alternating a move of the text information with a pause in the movement. For example, the text can move upward until one line disappears from view and a new line becomes visible, at which time the movement pauses for a period of time. The move and pause operation repeats periodically. Regardless of the scrolling approach, the movement of the text exhibits a scroll rate, i.e., the rate at which the text moves through the display. For an approach such as the move-and-pause technique, the scroll rate may be viewed as an average rate of movement.

The present invention resides, in part, in apparatus and a method for providing a scrolling feature for further improving the comprehensibility of displayed text information. The rate at which displayed text information is scrolled is modulated in response to an amount of text information available for display. The text information is supplied by a character source such as a closed caption decoder in a television receiver, a "moving message" decoder, or some other source of text information.

Apparatus of the present invention includes a buffer memory coupled to a character source and to a read address generator. Text characters or character codes representing particular characters are serially provided by the source and temporarily stored in the buffer. The read address generator selectively addresses the buffer to access and recall the characters or character codes from the buffer. The characters or character codes are then coupled to a character or character control signal generator which conventionally produces either characters for direct display on a display device or a control signal that facilitates display of closed caption characters at a user defined location on a television screen.

The read address generator produces addresses at a controlled rate. The address generator modulates the scroll rate of the display in response to an amount of text information in the buffer (e.g., the scroll rate increases as the fullness of the buffer increases) and, in particular, in response to an amount of previously undisplayed information in the buffer. A text display operating in accordance with principles of the invention scrolls displayed text more rapidly as the rate at which text information is received increases. For example, the scroll rate of closed caption text varies in response to variations in the rate at which persons depicted in a television scene speak.

In an exemplary embodiment of the invention, a PIP caption contains two rows of caption text. When two full rows of text fill the caption window (home position), the scroll function pauses and thereafter scrolls a new line of text into the window. This pause at the home position is modulated to increase or decrease its duration depending upon the buffer fullness. When the buffer is very full, no pause is generated and the displayed text continuously scrolls.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
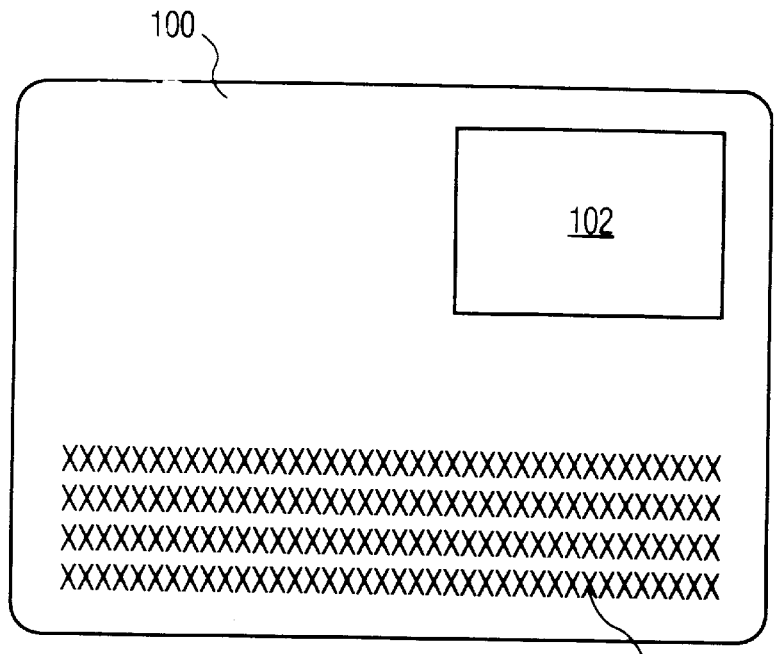
FIG. 1 depicts a PIP captioning orientation as implemented in the prior art.
Figure 2:
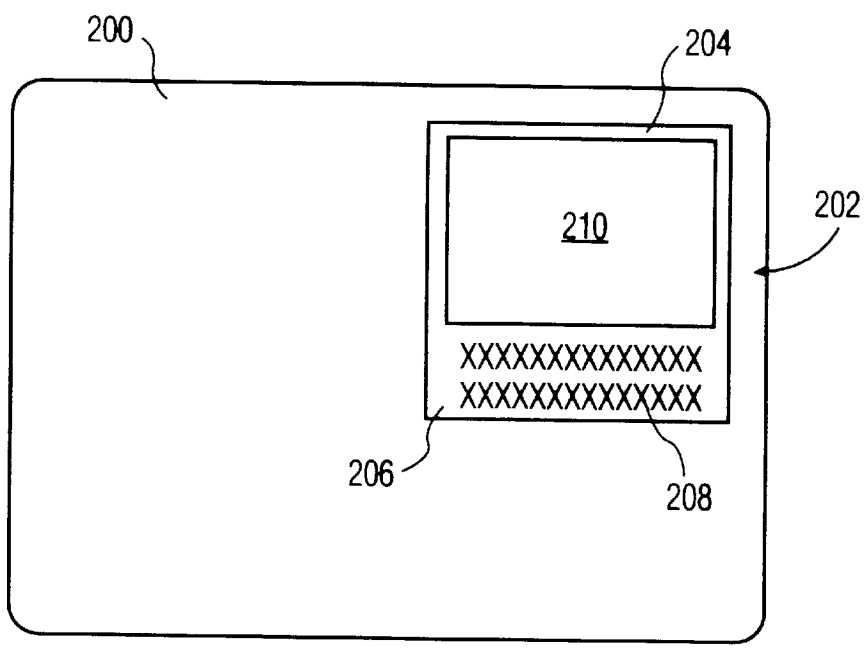
FIG. 2 depicts the orientation of the PIP closed caption information positioned proximate the PIP image.

FIG. 2 depicts the image orientation of a PIP image 202 in relation to a main picture 200 as produced by a PIP captioning image generation system that positions the PIP caption proximate the PIP image. The position of PIP image 202 within the confines of the main picture 200 is conventionally defined by a viewer. Specifically, the viewer through a remote control, defines a vertical line number (vertical position) and a pixel location (horizontal position) where one corner (e.g., upper left corner) of the PIP image is to be located. The active region 210 of the PIP image 202, where the PIP video is displayed has a typical dimension of one-third by one-third of the size of the main picture 200. The PIP image area 210 (active region) is circumscribed by a border region 204. In the normal operating mode, e.g., without closed captioning, the border of the PIP image is approximately 0.25 inches (0.64 cm) wide on all sides of the active image area 210. Upon activation of the closed captioning for the PIP image, the bottom border area 206 is extended to a height of approximately 2 inches (5 cm). The closed caption information is displayed in this 2 inch tall region (referred to as a closed caption window) as 2 lines of closed caption text 208. A system for producing this extended border area 206 and for positioning the closed caption information 208 within the extended border area (i.e., positions the caption for the PIP image proximate the PIP active image area 210) is described in the above-identified U.S. patent application Ser. No. 08/770,770 (Attorney Docket No. RCA 88,200) entitled "METHOD AND APPARATUS FOR POSITIONING AUXILIARY INFORMATION PROXIMATE AN AUXILIARY IMAGE IN A MULTI-IMAGE DISPLAY".

The closed caption text 208 contains reformatted closed caption characters. Closed captioning standard EIA-608 specifies a closed caption character format comprising a display character grid of 15 rows by 32 columns with up to four rows of characters being displayed at any one time. Although these standard characters could be displayed proximate the PIP image, the invention generally uses characters that are reformatted by translating the standard character set into a reduced character set, utilizing a smaller font size, and displaying only two rows of 18 characters each within the PIP captioning window, e.g., the two-inch tall border extension. The reformatting facilitates viewer comprehension and minimizes main picture obstruction. One example of a closed caption generator that provides reformatted characters is disclosed in above-identified U.S. patent application Ser. No. 08/769,332 (Attorney Docket No. RCA 88,490) entitled "METHOD AND APPARATUS FOR REFORMATTING AUXILIARY INFORMATION INCLUDED IN A TELEVISION SIGNAL".

To provide a comprehensive and readable caption, the present invention scrolls the caption text into the two line caption window. When two lines of text are displayed (a scroll position referred to as a home position), the scrolling is paused. The duration of the pause varies depending on the amount of previously undisplayed text information that is available for display. As the amount of text available for display increases, the rate of scrolling increases, i.e., the duration of the pause decreases. Generally, the amount of text available for display depends upon the rate at which text information is received. For example, in the case of closed captioning, an increase in the rate of speech in a television program increases the rate at which the associated closed caption data representing speech is received. Ultimately, text information can be received so rapidly that the duration of the pause in scrolling becomes zero. By modulating the pause duration, the effective scroll rate of the closed caption text is modulated.

Figure 3:
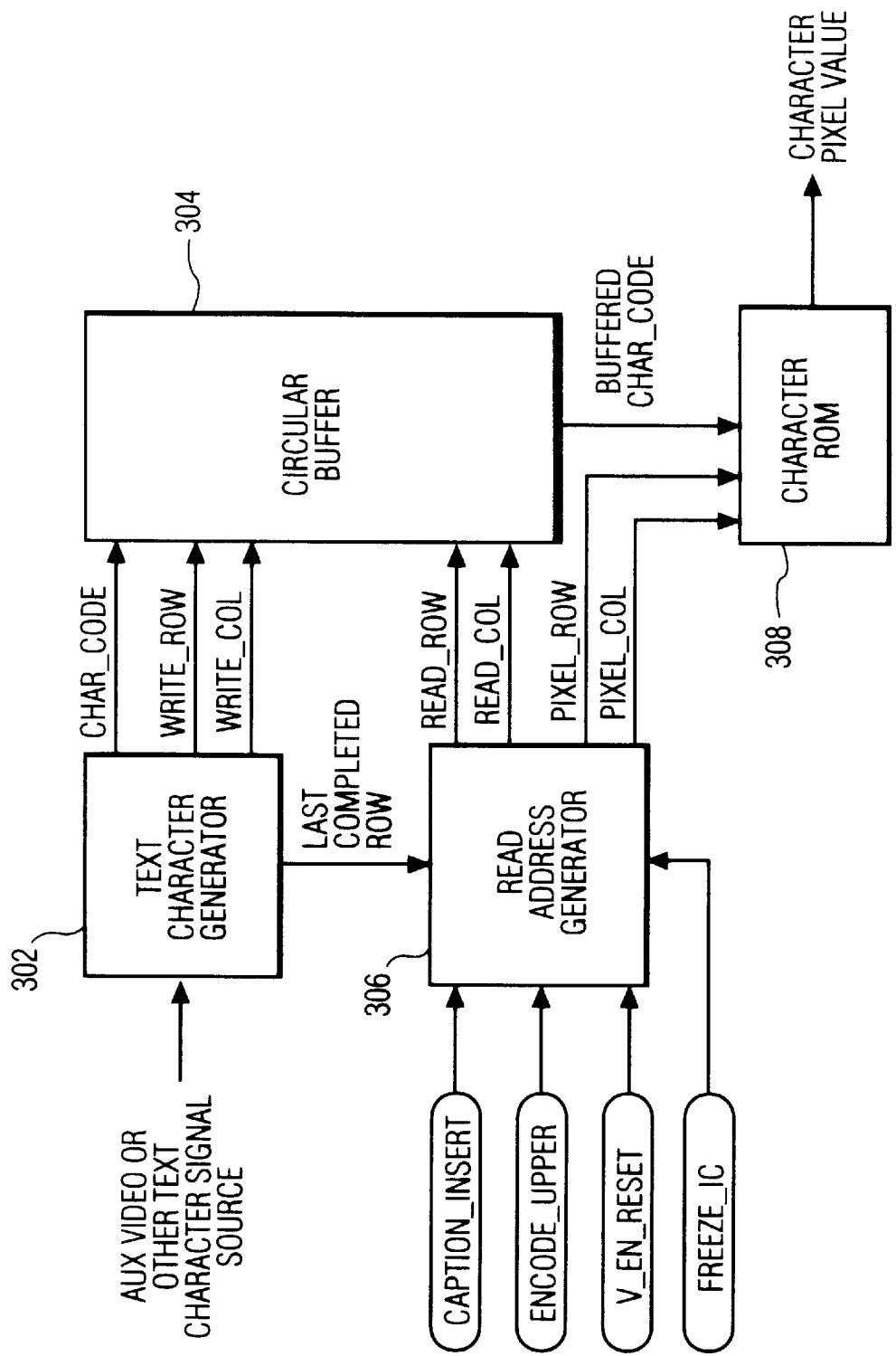
FIG. 3 depicts a block diagram of circuitry for generating a text display in accordance with the present invention.

FIG. 3 depicts a block diagram of the present invention. This apparatus contains a text character generator 302, a circular buffer 304, a read address generator 306, and a character ROM 308. Generally speaking, the text character generator 302 produces characters or character codes representing characters. The text signal input to generator 302 may be from various sources. Examples of such sources are an auxiliary information signal component extracted from a television signal, such as a closed caption signal or a teletext signal, and a moving message signal extracted from a messaging or sub-carrier signal.

In one embodiment of the invention, the text character generator 302 is a closed caption character generator. Such a closed caption character generator produces closed caption character codes from an auxiliary information signal component of a television signal in a conventional manner. The positioning of these characters in the rows and columns of the screen display are produced in accordance with a reformatted character generation technique such as that disclosed in above-identified U.S. patent application Ser. No. 08/769,332 (Attorney Docket No. RCA 88,490) entitled "METHOD AND APPARATUS FOR REFORMATTING AUXILIARY INFORMATION INCLUDED IN A TELEVISION SIGNAL". Specifically, the closed caption character generator produces a character code, such as a byte of ASCII encoded data identifying a particular character, as well as a row and column designator address (write addresses WRITE_ROW and WRITE_COL) that identifies which of the memory locations in each line of character text the character or character code is to be stored. In addition, a LAST COMPLETED ROW signal is generated and coupled to the read address generator 306 to indicate the row number of the last row that was written to the circular buffer.

For the embodiment of the invention which facilitates displaying caption text proximate a PIP image, the circular buffer 304 contains M columns (e.g., 18 columns) and N rows (e.g., 16 rows) of character code storage. Of course, other applications for a modulated scroll rate caption may use a larger or smaller circular buffer. As such, each character or character code generated by the generator 302 is stored at a specific row and column address. To retrieve the information from the circular buffer, the read address generator 306 provides a row and column read address (READ_ROW and READ_COL) to the circular buffer and the character or character code at that address is recalled from the buffer. The timing of row and column read address generation is controlled by a CAPTION INSERT signal. For PIP text, the CAPTION INSERT signal identifies the location of the screen where the caption is inserted. For other applications, this signal is merely a start command that activates the display. An example of a PIP captioning system that generates a CAPTION INSERT signal is described in the above-identified U.S. patent application Ser. No. 08/770,770 (Attorney Docket No. RCA 88,200) entitled "METHOD AND APPARATUS FOR POSITIONING AUXILIARY INFORMATION PROXIMATE AN AUXILIARY IMAGE IN A MULTI-IMAGE DISPLAY."

In addition to the character column and row read addresses, the read address generator 306 also produces pixel row and pixel column addresses which identify pixel location within a character to be displayed. The pixel row and pixel column address (PIXEL_ROW and PIXEL_COL) as well as the character code that is recalled from the buffer, i.e., signal BUFFERED CHAR_CODE, are applied to the character ROM 308. ROM 308 operates in a conventional manner to produce signal CHARACTER PIXEL VALUE which represents the current pixel value. Typically, signal CHARACTER PIXEL VALUE is one of two values: one logic state, e.g., logic 1, representing a pixel in the body of a character, or a second logic state, e.g., logic 0, representing the background of a character. The different pixel values produce respective different colors when displayed. For example, white for a pixel value of logic 1 and black for a pixel value of logic 0 produce displayed characters having a white body with a black background. For other display types such as "moving message" displays, the pixel row and pixel column addressing may not be generated in this circuit.

The read address generator 306 choreographs the flow of decoded character information from the circular buffer 304. As such, the read address generator 306 controls scrolling, inter-character blanking and display time-out. It also dynamically controls pause time between scrolls in response to the fullness of the circular buffer. As such, the read address generator in combination with the circular buffer provide a modulated text display scroll rate. The various functions of read address generator 306 are controlled in response to four control signals that, in addition to the above-mentioned signal CAPTION_INSERT, include signals ENCODE_UPPER, V_EN_RESET, and FREEZE_IC as shown in FIG. 3. The function of these three additional control signals is described in detail below.

To produce PIP text having a modulated scroll rate, the read address generator 306 produces row and column addresses for the character codes as well as the pixels such that the characters on the screen scroll from the bottom to the top of the caption window. When two full lines of characters appear on the screen, the scrolling pauses for a variable length of time, then begins to scroll upwards again until another two full lines of characters are displayed. The length of time that the display pauses is controlled by a measure of buffer fullness. For example, when a person depicted in the PIP image speaks rapidly, closed caption text characters are received at an increased rate in comparison to slow speech. As a result, buffer fullness increases and the pause is shortened. When two full lines of characters are displayed in the PIP caption window this position is referred to as the home position and the pause at this location is referred to the "home position pause". By modulating the home position pause duration the effective scroll rate is modulated. Although this embodiment of the invention modulates the effective scroll rate by altering the home position pause duration, those skilled in the art will realize that direct modulation of the speed of the scroll with a constant home position pause or no home position pause at all would also be within the scope of the invention.

Figure 4:
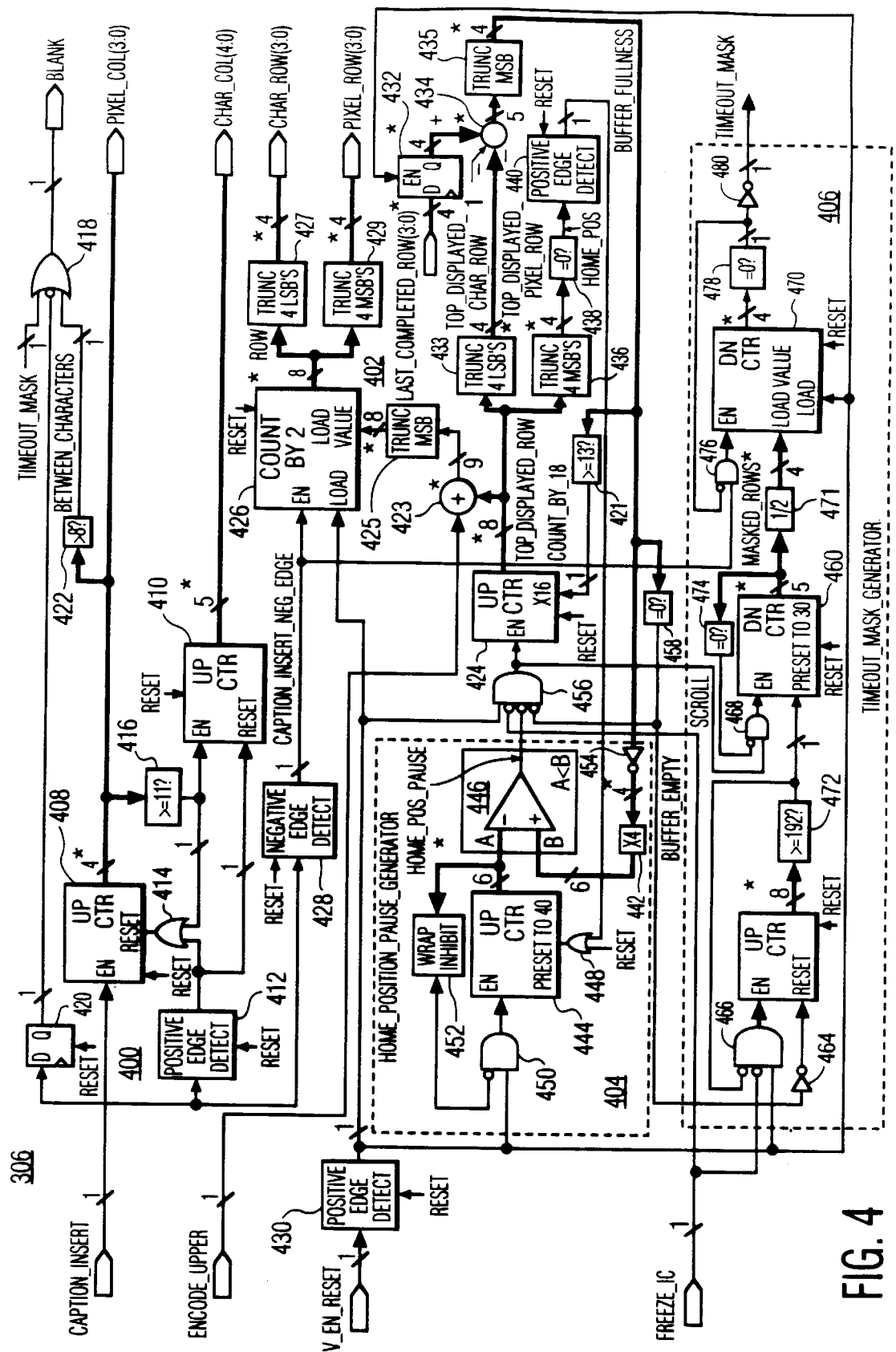
FIG. 4 depicts a block diagram of a read address generator.

FIG. 4 depicts a detailed block diagram of the read address generator 306 used in the PIP caption generator embodiment of the invention. FIG. 4 shows various features including counters, edge detectors, comparators, etc. that are operated synchronously in response to a single master clock signal that is not shown explicitly in FIG. 4 but is supplied to all functional blocks. The master clock signal has a 70 ns period and is phase locked to color burst. As shown in FIG. 4, read address generator 306 contains a read address column generator 400, a read address row generator 402, a home position pause generator 404, and a timeout mask generator 406. These elements of the invention provide read addresses (CHAR_COL and CHAR_ROW) at controlled intervals. The time out mask generator 406 produces a blanking signal that blanks the display when the buffer is empty for a predefined duration. The read address column generator 400 generates column addresses (PIXEL_COL and CHAR_COL) as well as a display blanking signal. PIXEL_COL is the output of a mod 12 counter 408, rephased to zero at the left border of the caption window, e.g., the counter is enabled during the caption window using the CAPTION INSERT signal. CHAR_COL is the output of a counter 410 which increments every time the pixel counter 408 completes a 12 count cycle. It is also rephased to zero at the left border of the caption window.

As such, the pixel counter 408 produces a PIXEL_COL address identifying each pixel location and the counter 410 increments every 12 pixels to produce a character column read address (CHAR_COL). Consequently, within the caption window a caption character is inserted every 12 pixels.

More specifically, the CAPTION INSERT signal is coupled to the enable port of counter 408 and to the input of a positive edge detector 412. The output of the positive edge detector 412 is coupled to an input of an OR gate 414 and to the reset terminal of counter 410. The output of counter 408 is a 4-bit value representing a pixel number within the present character. This value is coupled to the input of a count comparator 416 having a threshold of eleven. The output of comparator 416 is coupled to both the second input of OR gate 414 and the enable port of counter 410. The output of the OR gate 414 is coupled to the reset terminal of counter 408. Counter 410 is a mod 18 counter that produces the CHAR_COL signal indicating the present character column, i.e., one of the 18 character positions in a character row.

Inter-character blanking is provided by activating the BLANK signal when the pixel column count is greater than 8. Specifically, the blanking signal is generated by OR gate 418. Gate 418 has a first input coupled to the TIMEOUT MASK signal (discussed below), a second input (inverted) coupled to a D flip-flop 420, and a third input coupled to a count comparator 422. The D flip-flop has its D input terminal coupled to the CAPTION INSERT signal. The input of comparator 422 is the count value of counter 408. With the comparator threshold set to eight, the blanking signal is HIGH (blanking active) every eight pixels, e.g., between characters. The blanking signal is also active outside the caption window as controlled by the CAPTION INSERT signal and also at other times as controlled by the TIME OUT MASK signal.

The read address row generator 402 generates row addresses (PIXEL_ROW and CHAR_ROW). This generator provides scrolling and dynamic pausing between scrolls. To understand the operation of this generator, think of CHAR_ROW and PIXEL_ROW as most significant bits (MSBs) and least significant bits (LSBs) of a signal ROW. ROW is a number from zero to 255, and defines a vertical position in the circular buffer containing 16 character rows, each composed of 16 pixel rows. One feature of the read address row generator 402 is a "slow" row counter 424. This counter produces a TOP_DISPLAYED_ROW value, which defines the row in the circular buffer which will be displayed as the first row in the caption window. This counter is normally incremented once per field (which produces scrolling), but is inhibited from incrementing when either a pause is active or the circular buffer is empty. A second, "fast", counter 426 produces the signal ROW, described previously. This counter is preset to TOP_DISPLAYED_ROW or TOP_DISPLAYED_ROW+1 on alternate fields at the top of the field. The preset value is determined by adding the value of signal ENCODE_UPPER to the value of signal TOP_DISPLAYED_ROW in adder 423 followed by truncating the resulting 9-bit value to the 8 LSBs in truncating circuit 425. For a system such as the exemplary PIP captioning system described herein, signal ENCODE_UPPER is produced by conventional synchronization circuitry associated with the main or "big" picture and exhibits a logic 1 or logic 0 to indicate that field 1 (i.e., the "upper" field) or field 0 (i.e., the "lower"field), respectively, of the main picture is currently being displayed. Adding the value of ENCODE_UPPER introduces a "+1" on alternate fields into the preset value for counter 426. This alternating "+1" in the preset value combined with incrementing by two in counter 426 for each line during the active caption period, e.g., during the caption window, provides a properly interlaced character display as required.

The signal BUFFER_FULLNESS, indicates the number of previously undisplayed character rows that are stored in the buffer, i.e., the number of character rows that have been stored in the circular buffer, but have not yet been displayed. Signal BUFFER_FULLNESS is used to control the pause time between scrolls. The home position pause generator 404 inhibits scrolling when the previous scroll results in characters being displayed in the "home position", i.e., the top displayed pixel row is the top pixel row of a character row. The length of time scrolling is inhibited is determined by a formula relating the pause time to the fullness of the buffer as follows:

$$\text{pause time (fields)} = \text{MAX}((\alpha - \beta * \text{BUFFER\_FULLNESS}, \gamma). \quad (1)$$

where $\alpha$ represents a maximum pause time in field intervals, $\gamma$ represents a minimum pause time, and $\beta$ is a constant determined empirically. For the embodiment described herein, exemplary values for $\alpha$, $\beta$, and $\gamma$ are 20 field intervals, 4, and 0, respectively. Thus, for the exemplary embodiment, when BUFFER_FULLNESS is zero, the pause interval is 20 field intervals, and when BUFFER_FULLNESS is five or more, the pause duration is zero resulting in continuous scrolling.

More specifically, the CAPTION INSERT signal is coupled to an input of negative edge detector 428. The output of detector 428 is coupled to the enable terminal of counter 426. The output of counter 426, an 8-bit value, is divided and truncated via truncation circuits 427 and 429 into a character row address that is the 4 MSBs of the count value and a pixel row address that is the 4 LSBs of the count value. Counter 426 is loaded with a load value in response to the output of positive edge detector 430. The detector produces the load control signal for counter 426 in response to a vertical reset signal V_EN_RESET. For a multi-image display system (such as a picture-in-picture television system) that produces a main picture and an auxiliary picture, signal V_EN_RESET is produced by main-picture synchronization circuitry (not shown in the drawings) and is active during the vertical interval of the main picture. Signal CAPTION INSERT activates the read address generator starting at a particular vertical line number in the main picture and continuing for a number of line numbers representing the caption window height. The load value is the TOP_DISPLAYED_ROW signal generated by counter 424. The TOP_DISPLAYED_ROW signal is also processed into control signals for both the time out mask generator 406 and the home position pause generator 404.

In particular, the TOP_DISPLAYED_ROW signal is coupled to a truncating circuit 433 which outputs only the four MSBs of signal TOP_DISPLAYED_ROW to produce signal TOP_DISPLAYED_CHAR_ROW. Subtractor 434 subtracts the value of signal TOP_DISPLAYED_CHAR_ROW plus one from the latched (latched by D flip-flop 432) value of the last completed row written to the circular buffer that is provided by the LAST_COMPLETED_ROW signal. The LAST_COMPLETED_ROW signal is generated by the buffer write circuitry included in block 302 in FIG. 3. As the signal name indicates, LAST_COMPLETED_ROW is the row address of the buffer row that was most recently filled with data. Truncation circuit 435 selects the four LSBs of the difference value output by subtractor 434 to produce signal BUFFER_FULLNESS which represents the fullness of the buffer. BUFFER_FULLNESS is equal to zero when the value of LAST_COMPLETED_ROW is one more than the value of TOP_DISPLAYED_CHAR_ROW. BUFFER_FULLNESS equal to zero indicates that there is no previously undisplayed data in the buffer. Signal BUFFER_FULLNESS is coupled to home position pause generator 404 because home position pause duration is determined in response to the BUFFER_FULLNESS value.

The home position is determined by series connected truncating circuit 436, comparator 438 and positive edge detector 440. These elements truncate the four MSBs of the TOP_DISPLAYED_ROW value, compare the four LSBs to zero, and detect the positive edge of the comparator signal when the LSBs equal zero. At that time the text display has scrolled to the home position. That is, the display has scrolled one full character row and two full character rows are displayed. A pause may be warranted at the home position depending upon the buffer fullness.

The home position pause generator 404 generates a pause control signal in response to buffer fullness as indicated by signal BUFFER_FULLNESS. FIG. 4 depicts an illustrative embodiment of this generator. Those skilled in the art will realize that there are many other implementations available to produce a pause control signal in response to buffer fullness, e.g., using different polarities of signals, different logic devices, etc.

Specifically, the home position pause generator 404 contains a multiplier 442, a counter 444, a comparator 446, an OR gate 448, an AND gate 450 a wrap inhibitor 452, and an inverter 454. The inverter 454 inverts the BUFFER_FULLNESS value and couples it to multiplier 442. The multiplier multiplies the inverted value by four and couples the 6-bit value to the B or positive input terminal of comparator 446. The home position signal is coupled to one input of OR gate 448 and the other input terminal is coupled to a reset signal. The output of the OR gate presets the counter to forty. The output signal of the positive edge detector 430 forms one input to AND gate 450. Another AND gate input is coupled to the output of the wrap inhibitor 452. The 6-bit counter output value is coupled to the input of the wrap inhibitor as well as the A or negative input terminal of the comparator 446. This circuit implements equation (1) above such that the pause duration is responsive to the buffer fullness.

The pause control circuit is coupled to one input of AND gate 456. Other inputs to this AND gate include the output of positive edge detector 430, a FREEZE_IC signal that is discussed below and a BUFFER_EMPTY signal that indicates when no previously undisplayed text is stored in the buffer. The BUFFER_EMPTY signal is generated by comparator 458 which compares the BUFFER_FULLNESS value to zero. The output of AND gate 456 is signal SCROLL which is coupled to the enable input of counter 424. Scrolling of the text information display occurs by one pixel row per field as a result of counter 424 incrementing the value of signal TOP_DISPLAYED_ROW by 1 per field interval. A logic 0 at the output of AND gate 456 pauses scrolling of the display by preventing counter 424 from incrementing the value of TOP_DISPLAYED_ROW. The combination of signals provided by AND gate 456 causes incrementing of counter 424 to be inhibited during the pause interval determined by the HOME_POSITION_PAUSE_GENERATOR, when the buffer is empty, or when signal FREEZE_IC is active.

Another feature provided by counter 424 is a mode of scrolling referred to herein as "hyper scrolling". Varying the scroll rate according to equation (1), and in particular continuously scrolling at a rate of one pixel row per field when BUFFER_FULLNESS reaches a particular value, should ensure that the circular buffer does not overflow (i.e., the amount of information being written into the circular buffer exceeds the buffer capacity) for most text information data rates. However, abnormal data rates could possibly cause overflow resulting in lost information or, at least, the appearance that the caption display is not "keeping up" with the audio content. To prevent such an occurrence, comparator 421 compares the value of signal BUFFER_FULLNESS to 13. If BUFFER_FULLNESS is greater than or equal to 13, the output of comparator 421 is at logic 1 which causes counter 424 to increment by 16 each field. That is, the display scrolls by one complete character row each field. This "hyper" rate of scrolling ensures that the display will keep up with the incoming data under all conditions.

The timeout mask generator 406 blanks the character display if the circular buffer has been empty for more than a predefined number of fields, e.g., 192 fields or approximately 3 seconds. A long pause in the captioning results in the text display being blanked such that the last text displayed is not displayed for more than approximately 3 seconds. If new captions are received, they scroll into a fresh display (i.e., the "retired" caption does not reappear). This circuit is similar to the read address row generator 402 in that it uses both a "slow" counter 462 and a "fast" counter 460 which produces a signal MASKED_ROWS which indicates the number of rows to be masked. Counter 460 is preset and held to 30, causing signal MASKED_ROWS to be held at 30, when the circular buffer has been empty for more than 192 fields, i.e., the output of comparator 472 is active (e.g., at logic 1). Counter 462 counts for 192 fields before its output changes states, assuming the counter is not reset before attaining the 192nd count. The BUFFER_EMPTY signal is coupled to an inverter 464 and the inverted signal is connected to the reset terminal of the counter. Thus, counter 462 is reset when signal BUFFER_EMPTY is not active (i.e., BUFFER_FULLNESS not zero meaning there is previously undisplayed text in the buffer) and up counts if enabled when signal BUFFER_EMPTY is active (i.e., BUFFER_FULLNESS equals zero meaning there is no previously undisplayed text in the buffer).

A FREEZE_IC signal is a deactivation command that stops (freezes) the display of data. Signal FREEZE_IC is a flag that indicates when a user has selected to freeze the auxiliary image in a multi-image display. For example, in a PIP system, one user-selectable option may be "FREEZE PIP" (e.g., a particular button on a remote control) which "freezes" the PIP image, i.e., prevents the PIP image from changing in response to new video information. A user may select the freeze PIP option, for example, to have time to record a phone number that is included in the PIP image. When the PIP video is frozen, it is desirable for PIP captioning to also be frozen. In a typical television system controlled by a controller such as a microprocessor, user selection of a "FREEZE PIP" option causes the controller to set a bit in a flag register. The flag register values are communicated to the PIP function, e.g., an integrated circuit (IC) including functions described herein, via a data bus such as the well-known $I^2C$ serial data bus. The bit value indicating PIP freeze is converted into signal FREEZE_IC in the PIP IC.

In FIG. 4, an active state of logic 1 on signal FREEZE_IC halts scrolling of the displayed text information via AND gate 456 as described above and inhibits TIMEOUT_MASK_GENERATOR 406 to prevent blanking of the displayed text after the timeout interval. More specifically, signal FREEZE_IC inhibits TIMEOUT_MASK_GENERATOR 406 via AND gates 466 and 468. Note that signal FREEZE_IC is coupled to an input of AND gate 468 via AND gate 456 and signal SCROLL. The outputs of AND gates 466 and 468 disable counting by counters 462 and 460, respectively, when signal FREEZE_IC is active (e.g., at logic 1). Signal V_EN_RESET (described above) is also an input to AND gates 466 and 468 (via AND gate 456) and provides a load command for counter 470. Another input of AND gate 466 is the output of count comparator 472 which has a threshold of 192. If the buffer is empty for 192 fields, the output of comparator 472 provides a signal transition which presets the value of down counter 460 to 30. The output of down-counter 460 is coupled to a comparator 474 having a zero threshold and the output of comparator 474 is coupled to one input of AND gate 468. The output of AND gate 468 is coupled to the enable terminal of counter 460. Counter 460 counts down from 30 (the preset value) to 0 at which time the output of comparator 474 disables counter 460 via AND gate 468.

Counter 470 generates signal TIMEOUT_MASK. AND gate 476 has one input coupled to negative edge detector 428 and another input coupled to the output of counter 470. The output of the AND gate 476 is coupled to the enable terminal of counter 470. As such, counter 470 is enabled during the caption window and counts down from the loaded value indicating the rows to be masked. The output of counter 470 is coupled through a zero threshold comparator 478 to disable the counter when a zero count is attained. The output of the comparator 478 is coupled through an inverter 480 to form the timeout mask signal. This signal is coupled to OR gate 418 to produce a blanking signal that disables displaying certain character rows.

When a new caption is received and scrolling is active, the MASKED_ROWS value is decremented once per field until attaining zero (30 fields later). MASKED_ROWS divided by two (one-half factor in block 471) is loaded into the "fast" counter at the beginning of each field, and programs the number of lines which are blanked during the active caption period of that field. Consequently, previously displayed rows of characters are blanked when new characters are to be displayed. Thus, a comprehensible depiction of closed caption information is provided beneath the PIP image.

Figure 5:
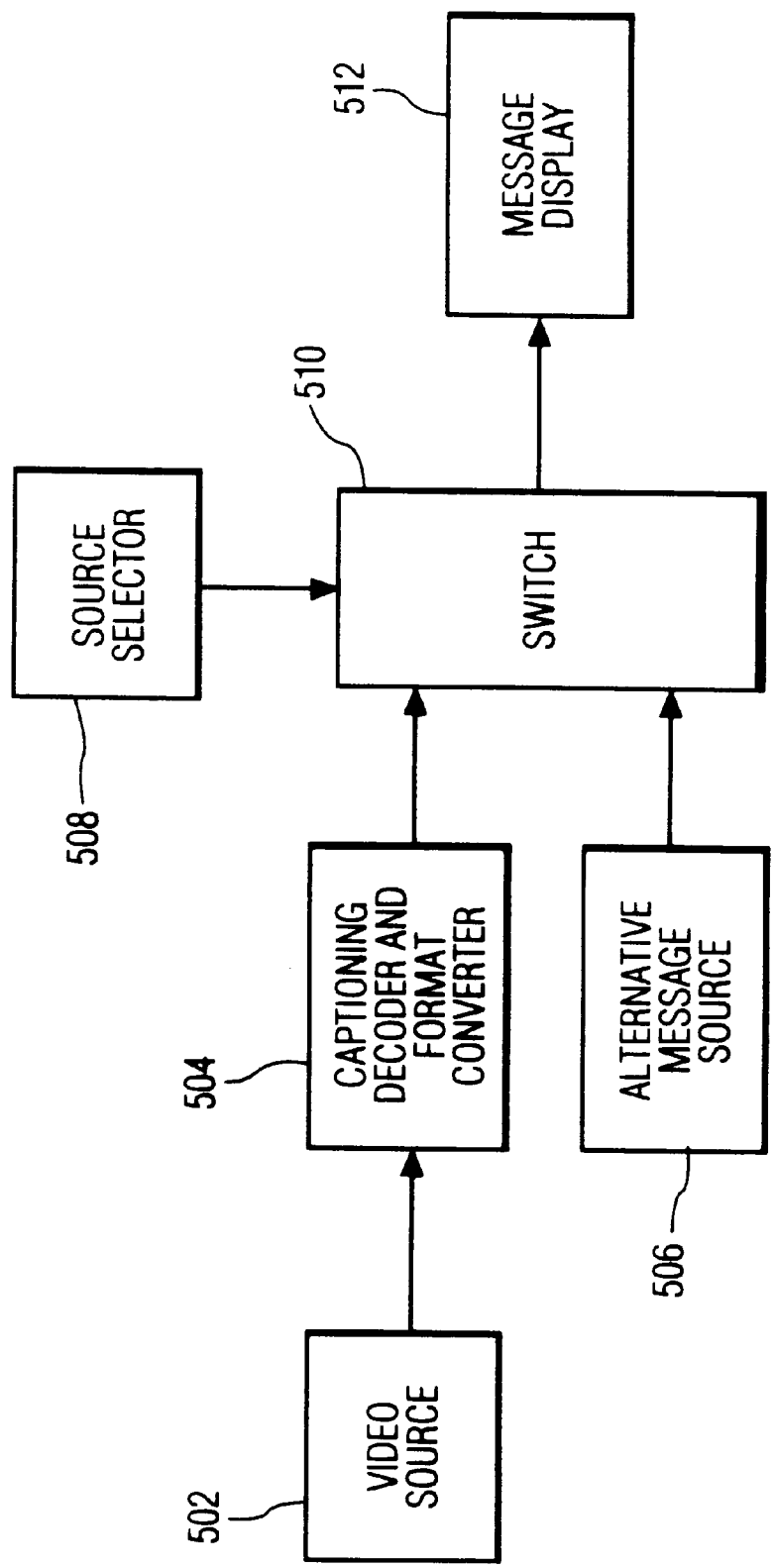
FIG. 5 depicts an alternative embodiment of the invention.

FIG. 5 depicts an alternative embodiment of the invention. In particular, the embodiment contains a video source 502, a closed captioned decoder and format converter 504, an alternate message source 506, a source selector 508, a switch 510 and a message display 512. The message display may be a "moving message" display having messages generated using an array of lights or LEDs, a video display of text only, or other such text display. The converter 504 generates closed caption text separate from a television such that information such as sporting event audio content can be displayed without a television or without the audio turned on. The converter provides the text information as described above, i.e., using a modulated scroll rate. The alternate message source is a conventional moving message signal. The source selection could be manual or assisted by a signal detector (not shown). Consequently, a user can select between displaying the conventional moving message or displaying closed caption signals in a comprehensive manner.

A further application of this invention is to produce closed caption text for movies shown in a movie theater. The text could be displayed using the modulated scroll rate technique on a special below screen display or on the screen using polarizing techniques such that the text is only observed by viewers wearing special polarizing glasses.

Although various embodiments which incorporate the teachings of the present invention have been shown and described in detail herein, those skilled in the art can readily devise many other varied embodiments that still incorporate these teachings.

We claim:

1. Apparatus comprising:
   a signal processing channel for processing an input signal to produce text information;
   a buffer memory for storing said text information;
   means for reading said text information stored in said buffer memory and for processing said read text information to produce an output signal representing a display of a row of said text information;
   means for scrolling the display of said text information;
   means for detecting a particular condition of the display of said text information;
   means for pausing the scrolling of the display of said text information in response to detecting said particular condition; and
   means for varying the duration of the pause in response to the amount of text information stored in the buffer memory.

2. The apparatus of claim 1 wherein said amount of said text information that is stored in said buffer memory comprises an amount of previously undisplayed text information.

3. The apparatus of claim 2 wherein said means for reading said text information stored in said buffer memory comprises:
   first control means for determining said amount of previously undisplayed text information stored in said buffer memory; and
   second control means coupled to said first control means for modulating said scrolling means in response to variations in said amount of previously undisplayed text information stored in said buffer memory.

4. The apparatus of claim 3 wherein said means for modulating said scrolling means varies the rate of accessing said previously undisplayed text information stored in said buffer memory in response to variations in said amount of previously undisplayed text information stored in said buffer memory.

5. The apparatus of claim 4 further comprising a display device coupled to receive said output signal for producing said display of said text information.

6. The apparatus of claim 5 wherein said particular condition of said display comprises the display of a complete row of said text information.

7. The apparatus of claim 6 wherein said first control means generates a control signal indicating said amount of previously undisplayed text information stored in said buffer memory, and wherein said pause duration measured in display field intervals is defined by:

$$MAX(\alpha-\beta*BUFFER\_FULLNESS,\gamma)$$

where $\alpha$ represents a maximum pause time in display field intervals, BUFFER_FULLNESS represents the value of said control signal, $\gamma$ represents a minimum pause time, and $\beta$ is a constant.

8. The apparatus of claim 2 further comprising:
   means for detecting an empty condition of said buffer memory corresponding to said buffer memory containing no previously undisplayed text information; and
   means coupled to said means for detecting said empty condition for blanking said display after said empty condition exists for a predefined duration.

9. A method of modulating the scroll rate of displayable text information comprising the steps of:
   processing an input signal to produce text information;
   storing said text information in a buffer memory;
   displaying said stored text information in rows;
   scrolling the display of said text information;
   detecting a particular condition of the display of said text information;
   pausing the scrolling of the display of said text information in response to detecting said particular condition; and
   varying the duration of the pause in response to the amount of text information stored in the buffer memory.

10. The method of claim 9 wherein said particular condition of said display comprises display of a complete row of said text information.

11. The method of claim 10 wherein the amount of text information stored in the buffer memory comprises an amount of previously undisplayed text information stored in the buffer memory.

12. The method of claim 11 wherein the step of displaying said text information comprises
   determining said amount of previously undisplayed text information stored in said buffer memory; and
   modulating the duration of the pause in response to variations in said amount of previously undisplayed text information stored in said buffer memory.

13. The method of claim 12 wherein said step of modulating varies the rate of accessing said previously undisplayed text information stored in said buffer memory in response to variations in said amount of previously undisplayed text information stored in said buffer memory.

14. The method of claim 13 wherein the step of displaying comprises generating a signal representing said text information and coupling said signal to a display device.

15. The method of claim 14 wherein the step of pausing in response to said particular condition pauses for a time period defined by:

$$MAX[\{a-(b*BUFFER\_FULLNESS)\},g]$$

wherein "a" represents a maximum pause time in display field intervals, "BUFFER_FULLNESS" represents the value of said control signal, "g" represents a minimum pause time, and "b" is a constant.

16. The method of claim 11 further comprising:
   detecting an empty condition of said buffer memory corresponding to said buffer memory containing no previously undisplayed text information; and
   detecting said empty condition for blanking said display after said empty condition exists for a predefined duration.

17. The method of claim 16 wherein the step of blanking said display blanks said display until previously undisplayed text information is stored in said buffer memory.

18. The method of claim 9 wherein said input signal comprises a television signal; and said text information comprises closed caption information extracted from an auxiliary information component of said television signal.

19. A method of modulating the scroll rate of displayable text information on a display device comprising the steps of:
   extracting text information from an auxiliary information component of a first television signal;
   storing said text information in a buffer memory;
   processing said first television signal and a second television signal to produce a display having a first region displaying video information included in said first television signal, a second region displaying video information included in said second television signal, and a third region displaying said stored text information;
   processing said stored text information to produce an output signal representing a display of a row of said text information;
   pausing the step of processing of said stored text information in response to the processing of a complete row of said text information in said third region, thereby producing a scroll rate related to the amount of said text information that is stored in said buffer memory.

20. The method of claim 19 wherein the step of pausing in response to processing a complete row of said text information pauses for a time period defined by:

$$MAX[\{a-(b*BUFFER\_FULLNESS)\},g]$$

wherein "a" represents a maximum pause time in display field intervals, "BUFFER_FULLNESS" represents the value of said control signal, "g" represents a minimum pause time, and "b" is a constant.

* * * * *